US006765481B2

(12) United States Patent
Haigh et al.

(10) Patent No.: US 6,765,481 B2
(45) Date of Patent: Jul. 20, 2004

(54) ELECTRICAL ACTUATOR ASSEMBLY FOR HINGED VEHICLE SAFETY DEVICES

(75) Inventors: James A. Haigh, Shelby Township, MI (US); Richard J. Iminski, St. Clair Shores, MI (US); Robert C. Rabine, Shelby Township, MI (US); Kevin L. Wolf, Jr., Macomb Township, MI (US)

(73) Assignee: Transpec, Inc., Sterling Heights, MI (US)

( * ) Notice: Subject to any disclaimer, the term of this patent is extended or adjusted under 35 U.S.C. 154(b) by 38 days.

(21) Appl. No.: 10/287,234

(22) Filed: Nov. 4, 2002

(65) Prior Publication Data

US 2003/0089011 A1 May 15, 2003

Related U.S. Application Data

(60) Provisional application No. 60/338,289, filed on Nov. 13, 2001.

(51) Int. Cl.[7] .................................................. B60Q 1/26

(52) U.S. Cl. ................. 340/433; 340/425.5; 340/545.4; 116/28 R

(58) Field of Search ................................ 340/433, 456, 340/425.5, 480, 487, 545.4, 545.6, 552, 545.1; 116/28 R; 180/271

(56) References Cited

U.S. PATENT DOCUMENTS

| | | | | | |
|---|---|---|---|---|---|
| 4,275,379 | A | | 6/1981 | Nakano et al. | 340/81 R |
| 4,983,949 | A | | 1/1991 | Wicker | 340/433 |
| 5,260,685 | A | | 11/1993 | Parker | 340/447 |
| 5,293,151 | A | * | 3/1994 | Rose | 340/433 |
| 5,357,239 | A | | 10/1994 | Lamparter | 340/433 |
| 5,382,953 | A | | 1/1995 | Hauptli | 340/937 |
| 5,510,764 | A | | 4/1996 | Hauptli | 340/433 |
| 5,538,118 | A | | 7/1996 | Kempf et al. | 192/33 C |
| 5,560,462 | A | | 10/1996 | Gustin | 192/58.42 |
| 5,564,359 | A | * | 10/1996 | Harder | 116/28 R |
| 5,582,279 | A | | 12/1996 | Buchanan, Jr. et al. | 192/54.5 |
| 5,602,526 | A | | 2/1997 | Read | 340/457 |
| 5,634,287 | A | | 6/1997 | Lamparter | 40/572 |
| 5,675,315 | A | | 10/1997 | Issa et al. | 340/456 |
| 5,687,500 | A | | 11/1997 | Lamparter | 40/572 |
| 5,719,553 | A | | 2/1998 | Lamparter | 340/433 |
| 5,767,769 | A | | 6/1998 | Issa | 340/456 |
| 5,796,331 | A | | 8/1998 | Lamparter | 340/433 |
| 5,812,052 | A | * | 9/1998 | Swanger et al. | 340/433 |
| 5,867,092 | A | | 2/1999 | Vogt | 340/456 |
| 5,906,071 | A | | 5/1999 | Buchanan, Jr. | 49/360 |
| 5,979,114 | A | | 11/1999 | Aino | 49/360 |
| 5,982,131 | A | | 11/1999 | Clark et al. | 318/646 |
| 6,457,545 | B1 | * | 10/2002 | Michaud et al. | 180/272 |
| 2001/0022049 | A1 | | 9/2001 | Clark et al. | 49/360 |

OTHER PUBLICATIONS

ALLEGRO, Applications Information, Hall Effect IC Applications Guide (36 Pages).

* cited by examiner

*Primary Examiner*—Daniel J. Wu
*Assistant Examiner*—Phung Nguyen
(74) *Attorney, Agent, or Firm*—Reising, Ethington, Barnes, Kisselle, P.C.

(57) ABSTRACT

A school bus has a stop sign hinged on an electrical actuator assembly that is attached to the side of the bus. The actuator assembly includes an electric motor that pivots the hinged stop sign from a stored position adjacent the bus to an operative position extending outwardly of the bus in perpendicular fashion and back to the stored position and an electrical control unit that includes Hall effect sensors for controlling the electric motor. These and other components are protected in an outer sealed housing that has a removable cover to facilitate installation and repair. Installation and repair is further enhanced by a removable inner housing sub-assembly that carries the electric motor and the electric control unit and that provides additional protection for these two components. The school bus also has a crossing arm hinged on an identical electrical actuator assembly, that is attached to the front bumper of the bus near the passenger doors.

13 Claims, 4 Drawing Sheets

ELECTRICAL ACTUATOR ASSEMBLY FOR HINGED VEHICLE SAFETY DEVICES

This patent application claims priority of Provisional Patent Application No. 60/338,289 filed Nov. 13, 2001.

TECHNICAL FIELD

This invention relates to vehicle safety devices and more particularly to electrical actuator assemblies for pivoting vehicle safety devices such as stop signs and crossing arms that are hinged on school busses.

BACKGROUND OF THE INVENTION

U.S. Pat. No. 5,357,239 granted to Ronald C. Lamparter Oct. 18, 1994 discloses actuating devices for safety devices such as safety gates and stop signs that are pivotally mounted on school busses. The actuating device comprises a housing and a bracket that is pivotally mounted to the housing. The bracket is pivoted by an electric motor that acts through a gear reduction unit, a drive member, a torsion spring and a spring engager. The electric motor is disposed in the housing along with an electronic control circuit that includes wiring harnesses, relays and mechanical limit switches.

U.S. Pat. No. 5,719,553 granted to Ronald C. Lamparter Feb. 17, 1998 discloses a sealed electrical actuator assembly for hinged vehicle safety devices that is an improvement over the actuating device of the earlier patent. In this assembly, the electric motor and the electronic control circuit including mechanical limit switches, relays and motor switches are enclosed in a compact, sealed, tamper proof housing that protects the components from vandalism and adverse weather conditions.

Improved stop signs and safety gates (also known as crossing arms) are disclosed in U.S. Pat. No. 5,634,287 issued to Ronald C. Lamparter Jun. 3, 1997 for an Illuminated Housing Assembly; U.S. Pat. No. 5,796,331 issued to Ronald C. Lamparter Aug. 18, 1998 for an Illuminated Pivotal Sign Assembly; and U.S. Pat. No. 5,687,500 issued to Ronald C. Lamparter Nov. 18, 1997 for a Stop Sign Housing with Flashing Lights. In these assemblies, the electric motor and the electronic control circuit including mechanical limit switches, relays and motor switches are also enclosed in a sealed outer housing.

U.S. Pat. No. 5,812,052 granted to Eric C. Swanger et al Sep. 22, 1998 discloses a switch operated actuating device for a school bus stop arm or crossing arm that includes a pair of beam generators and a pair of beam sensors in a switch housing and a rotatable plate. The rotatable plate which rotates with the stop arm or the crossing arm, is disposed in an opening in the switch housing. The beam generators are mounted in the switch housing on one side of the opening at 180 degree intervals. The beam sensors are mounted in the switch housing on the other side of opening directly in the paths of the beams generated by the respective beam generators. According to the Swanger '052 patent specification the beam generators and beam sensors preferably operate on the Hall effect principle by which the beam is in the form of a magnetic field extending between the beam generators and the sensors. Alternatively, a photo-electric system may be used by which the beam generated is a light beam and the sensor is a photo-electric sensor for sensing the presence of the light beam.

The rotatable plate has diametrically opposed full radius portions and diametrically opposed notches. According to the Swanger '052 patent specification, each of the sensors generate a first control signal when passage of the beam from the affiliated beam generator is blocked by full radius portions and a second control signal when the beam passes through the notches. One of these two signals is used to move the stop arm or the crossing arm between retracted and extended positions and the other signal is used to stop movement of the stop arm or the crossing arm.

According to the Swanger '052 patent specification, the arrangement shown in the Swanger '052 patent eliminates or ameliorates the drawbacks associated with actuating devices employing mechanical limit switches that operate in an unsealed and relatively inexpensive housing mounted on the vehicle. However, the arrangement of the Swanger '052 patent has several disadvantages. First and foremost, the Swanger '052 arrangement requires a rotatable plate which adds unnecessary expense and complexity. Moreover, precision in locating the safety device in the deployed position and the stored position is very difficult because such precision depends not only on the precise location of the generators and the sensors with respect to each other in the switch housing but also on the precise shape of the rotatable plate and the precise location of the rotatable plate with respect to the switch housing.

The rotatable plate is also exposed to the environment in an unsealed and relatively inexpensive housing mounted on the school bus and thus the rotatable plate is susceptible to weather damage, road hazards and vandalism, particularly in the case of a crossing arm or safety gate.

The Swanger arrangement is also difficult to assemble because the switch housing must span the axis of the motor unit and the output drive shaft of the motor unit must extend through the switch housing to a connection with the pivot arm for the safety device. Such assembly requires an adjustable mounting bracket for the motor unit which must be attached to the housing before the switch housing is attached to the flange of the housing. This adds further expense.

Another drawback in connection with the preferred use of the Hall effect principle is that the generators of the magnetic field are necessarily spaced from the sensors to make room for the intervening rotatable plate. This necessary spacing requires either stronger generators of the magnetic fields or more sensitive sensors or both furthering increasing cost.

SUMMARY OF THE INVENTION

This invention provides an improved electrical actuator assembly for pivoting vehicle safety devices such as stop signs and crossing arms. Electrical and mechanical components for pivoting the vehicle safety device including an electric motor and an electronic control unit, are enclosed in a compact, sealed, tamper proof housing that protects the components from vandalism and adverse weather conditions. The electric control unit controls the electric motor in conjunction with permanent magnets that are affixed to a pre-existing drive member thereby eliminating the need for and expense of any extra part or parts such as the rotatable plate of the arrangement that is disclosed in the Swanger '052 patent.

BRIEF DESCRIPTION OF THE DRAWINGS

Objects, features and advantages of the invention will become more apparent from the following description taken in conjunction with the accompanying drawings wherein like references refer to like parts and wherein.

DETAILED DESCRIPTION OF THE PREFERRED EMBODIMENT

Figure 1:
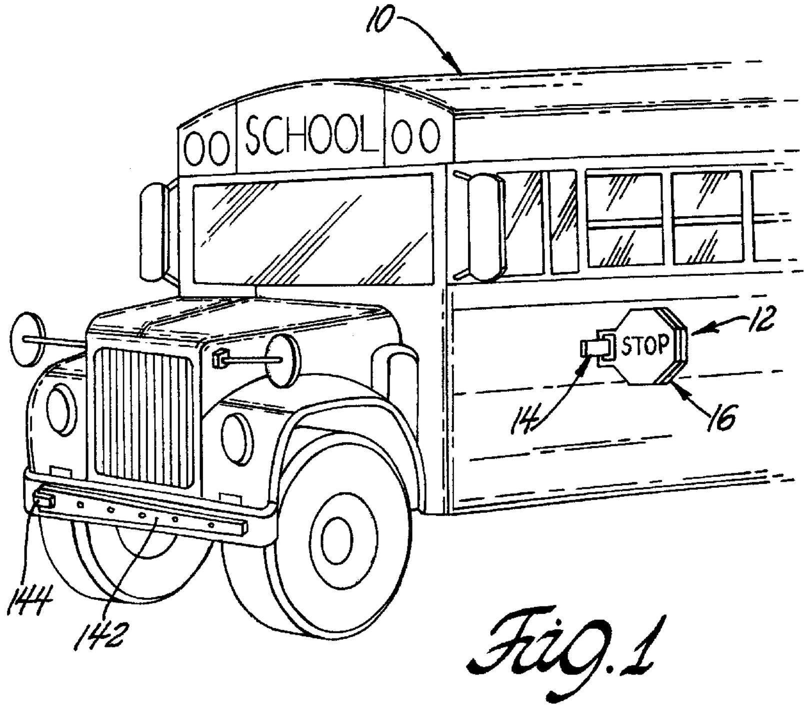
FIG. 1 is a perspective view of a school bus equipped with a hinged stop sign and an electrical actuating assembly of the invention for pivoting the hinged bus sign and a hinged crossing arm and an identical electrical actuating assembly for pivoting the crossing arm.

Referring now to the drawing, FIG. 1 shows a school bus 10 equipped with a stop sign mechanism indicated generally at 12. The stop sign mechanism 12 comprises a sealed electrical actuator assembly 14 of the invention that is mounted on the side 16 of the school bus 10 and a stop sign assembly 18 having integral arms that are hinged on the actuator assembly 14 for pivotal movement. The actuator assembly 14 pivots the stop sign assembly 18 between a retracted (stored) position adjacent the side 16 of the school bus 10 and an extended (operative) position where the stop sign assembly 18 extends outwardly of the bus side 16 in a perpendicular fashion as shown in FIG. 1.

The actuator assembly 14 of the invention provides a tamper proof and weather proof environment for several electrical and mechanical components including an electric motor and an electronic control unit for pivoting the stop sign assembly 18 back and forth between the stored position and the operative position.

The actuator assembly 14 has an outer box shaped housing 20 that comprises a base 22 that is secured to the side 16 of the bus 16 and a removable cover 24 that is secured to the base 22. The base 22 is attached to the side of bus 10 by four fasteners 26 that extend through mounting holes 28 in the bottom wall of base 22. The mounting holes 28 are located outside a continuous peripheral side wall 30 of base 22 that cooperates with cover 24 to provide a sealed environment inside the box shaped housing 20 as explained below.

The cover 24 has a top wall 32 that is provided with four recessed holes 33 and a continuous side wall 34 that matches the shape of the continuous side wall 30 of base 22. Base side wall 30 has an upstanding outer lip and cover side wall 34 has an upstanding inner lip that form a sealed overlap joint at the interface of side walls 30 and 34 as best shown in FIG. 3.

Figure 2:
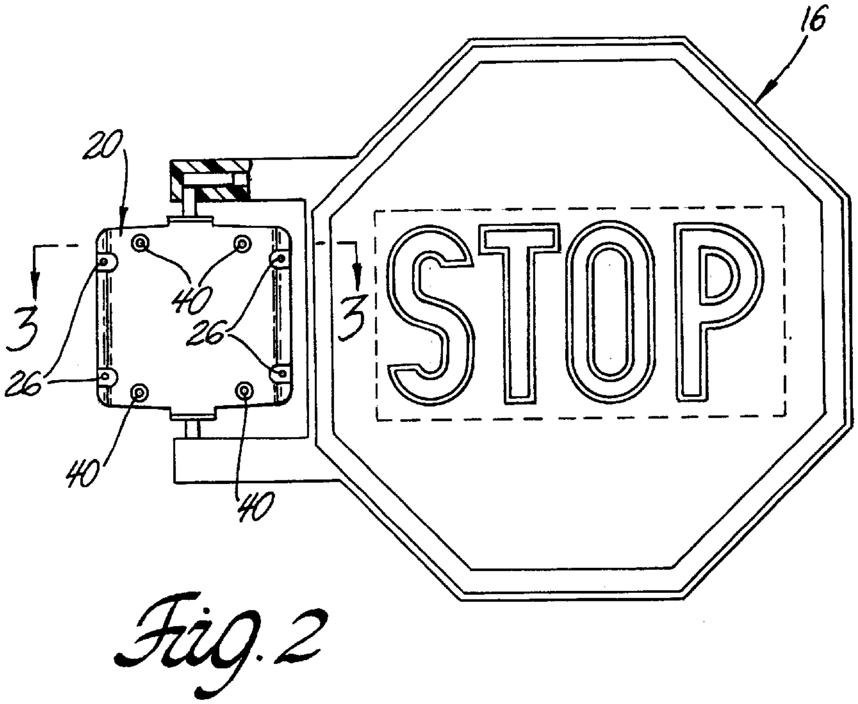
FIG. 2 is a front view of the hinged stop sign and electrical actuating assembly that is shown in FIG. 2.
Figure 3:
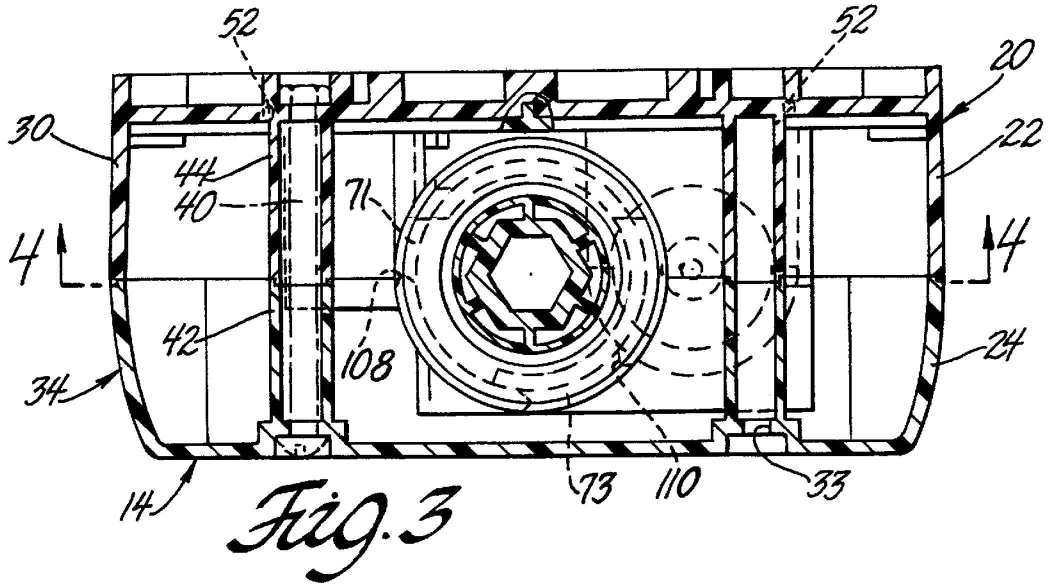
FIG. 3 is a section taken substantially along the line 3—3 of FIG. 2 looking in the direction of the arrows.

The base 22 and cover 24 are attached together by four fasteners 40 (FIG. 2) that are inserted into the recessed holes 33 (FIG. 3). The cover 24 has pendant tubes 42 aligned with the recessed holes 33 and integrated with the side wall 34. The base 22 has matching pendant tubes 44 that are integrated with its side wall 30. The tubes 42 and 44 mate end-to-end with portions of the upstanding lips 36, 38 forming a sealed overlap joint that isolates the tubes 42, 44 inside the outer housing 20 and the fasteners 40 from the sealed cavity inside the outer housing 20. A typical fastener 40 comprising a bolt and lock nut is shown in phantom in FIG. 3.

The base 22 and cover 24 each have two semicircular recesses opposite each other in their respective side walls 30 and 32 that form two round holes for supporting two flanged brass collars 47 respectively.

The brass collars 47 in turn receive the respective round ends of two hollow, L-shaped arms 48 to pivotally attach the stop sign assembly 18 to the actuator 14. The brass collars 47 are cradled and held in the recesses of the base 22 by the recesses of the cover 24. Thus the cover acts in the manner of a bearing cap so that the brass collars 47 and arms 48 can be lifted off the base 22 when the cover 24 is removed.

The L-shaped arms 48 are shown and described in detail in U.S. Pat. Nos. 5,634,287; 5,796,331 and 5,687,500 that are identified above and that are hereby incorporated in this patent specification by reference.

One hollow arm, preferably the lower arm 48 is used to route an electrical wiring harness for illuminating the stop sign assembly 18 that exits from the stop sign assembly 18 into the interior of the actuator housing 20. The other hollow arm, preferably the upper arm 48, is used to pivot the stop sign assembly 18 so that the round end of the upper hollow arm 48 extends through the upper brass collar 47 and then terminates in a hexagonal tip 50 that forms a driving connection as explained below.

The housing base 22 has an elevated bottom wall that includes a knock-out in each corner and a circumferential array of small pilot recesses 52 within the peripheral wall 30. The knock-outs 51 are punched out to provide an access hole or holes 51 for routing an electrical wiring harness from the outer housing 20 into the bus as shown in the upper left hand corner of FIG. 4. The small pilot recesses 52 locate an inner sub-assembly 54 inside the outer housing 20. This inner sub-assembly 54 provides a housing and further environmental protection for an electric motor 55 and a gear reduction unit 56. Sub-assembly 54 also carries a sealed electronic control module 57.

The inner sub-assembly 54 comprises a base member 58 and a cover member 60. The base member 58 includes a round base plate 62 that has a circumferential array comprising several pins 64 and two holes 66. The pins 64 fit into the recesses 52 to locate the subassembly 54 in the outer housing 20. The two holes 66 are used to removably attach the base plate 62 to the base 22 of the outer housing 20 with threaded fasteners.

Figure 7:
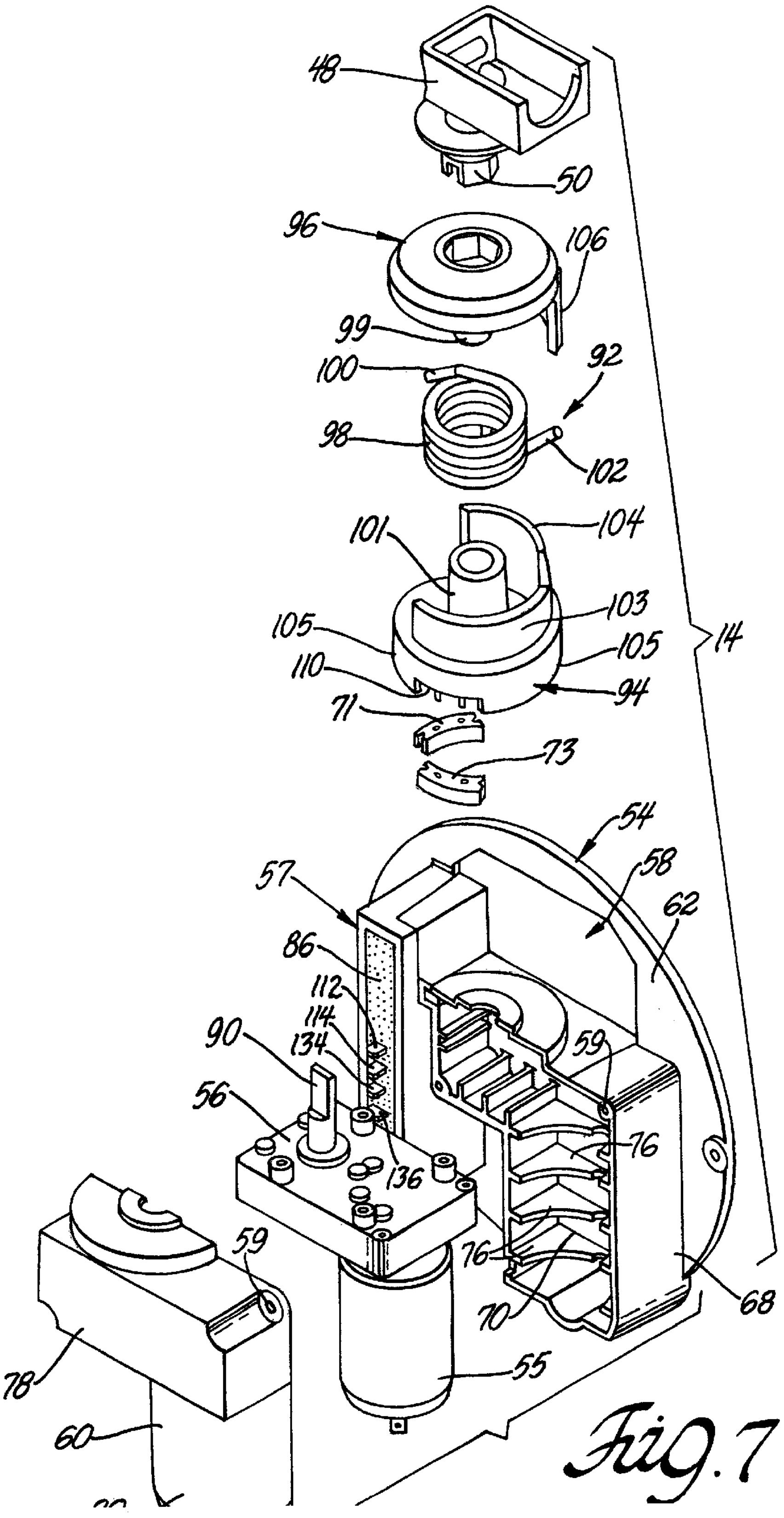
FIG. 7 is an exploded perspective view of the drive mechanism.
Figure 7:
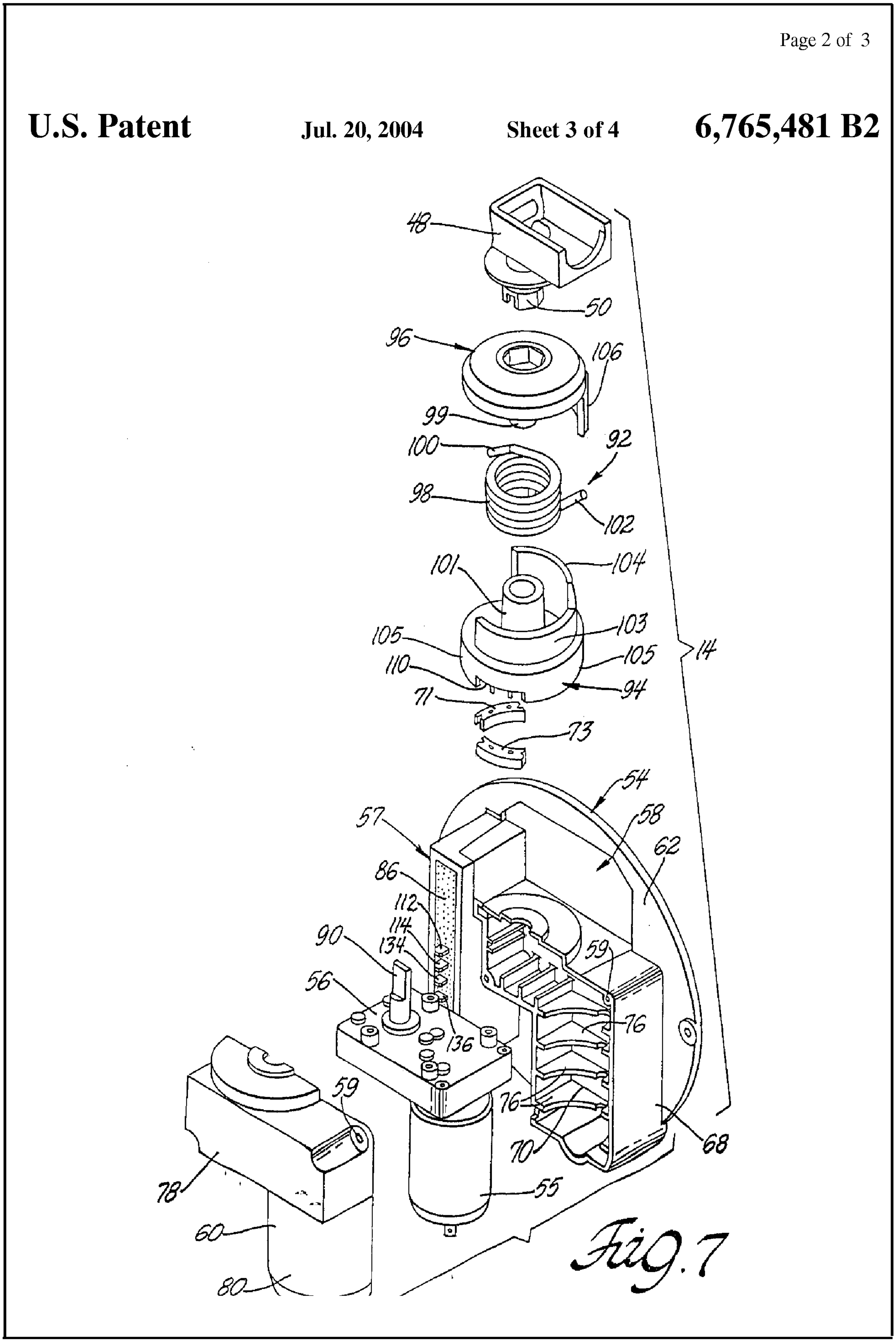
Figure 5:
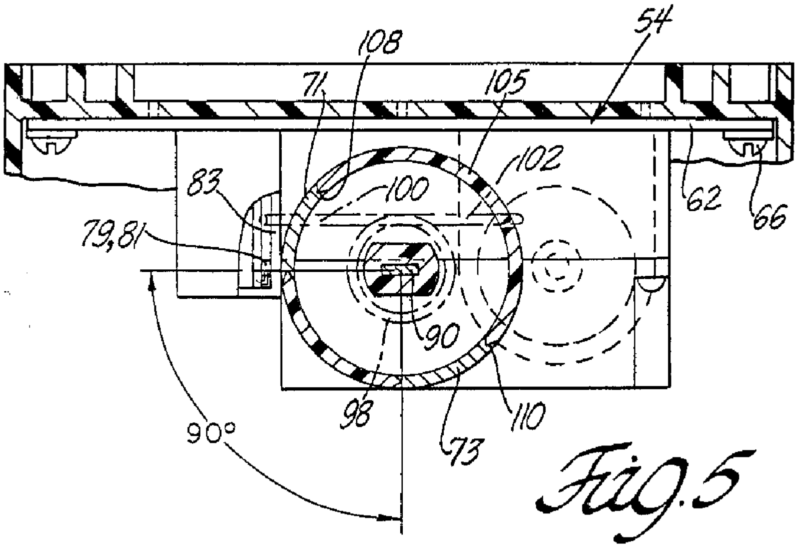
Figure 6:
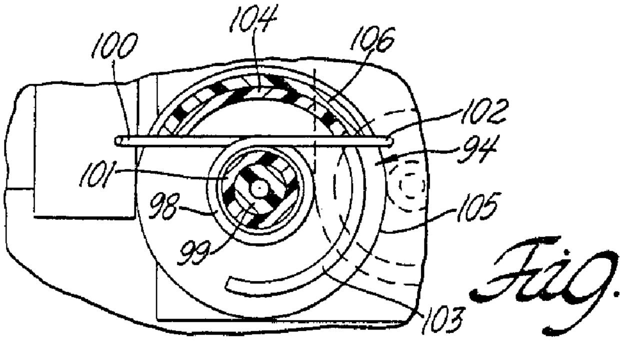
Figure 8:
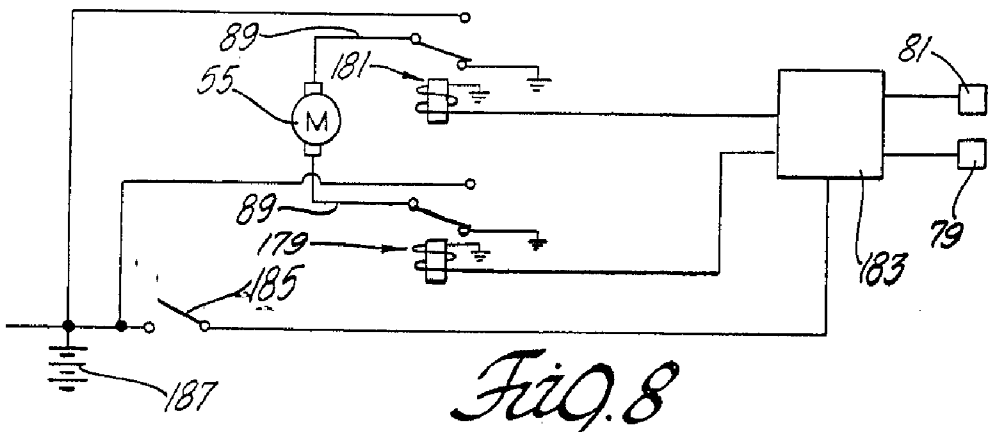

The base plate 62 of the inner base member 58 has an embossment 68 that forms an L-shaped cavity 70 and a rectangular cavity 72. The L-shaped cavity 70 has a rectangular portion 74 for housing the gear reduction unit 56 and a cradle portion with semi-circular ribs 76 for supporting the electric motor 55 as best shown in FIG. 7. The rectangular cavity 72 is part of the sealed electronic control module 57.

The cover member 60 is L-shaped and hollow and fits over the L-shaped cavity 70. One hollow leg 78 mates with the rectangular portion 74 of cavity 70 to complete a chamber for the gear reduction unit 56. The other hollow leg 80 fits over the cradle portion of cavity 70 to complete a chamber for the electric motor 55. The hollow leg 80 has semicircular ribs and a semicircular end wall. The semicircular ribs hold the electric motor on the ribs 76 of cradle portion while the semicircular end wall mates with the bottom wall of cavity 70 to provide space for electrical connections to motor 55.

The mating walls of the base member 58 and the cover member 60 have outer and inner upstanding lips and respectively that form a sealed overlap joint when the cover member 60 is attached to the base member 58 by threaded fasteners (not shown) that are screwed into threaded holes 59 at the opposite diagonal corners of the rectangular portion that houses the gear reduction unit 56.

The mating walls also each have a small semicircular groove that align with each other to provide a round hole for the output shaft 90 of the gear reduction unit 56. The round hole is laterally offset from the electric motor 55 to protect the motor 55 from damage from water or other contaminants that may have worked their way into the interior chamber of the outer housing 20. The upper end of the electric motor 55 is attached to the bottom of the gear reduction unit 56 and the lower end is above the bottom wall of cavity 70 to provide space for connecting two wire leads 89 to the electric motor 55 inside the inner housing of sub-assembly 54.

The actuating assembly 14 also includes a drive mechanism 92 that couples the output shaft 90 of the gear reduction unit 56 to the upper arm 48 for pivoting the stop sign assembly 18. As best seen in FIG. 7, the drive mechanism 92 comprises spool-like input member 94, an output member 96 and a torsion spring 98. The input member 94 is non-rotatably mounted on the output shaft 90 of the gear reduction unit 56 which extends into a shaft receiving socket of the input member 94. The output member 96 is non-rotatably attached to the upper arm 48 by a hexagonal socket that receives the hexagonal tip 50 of arm 48. The torsion spring 98 has radial legs 100, 102 at opposite ends of a coil for engaging the input member 92 and the output member 94.

The input member 94 has a hollow stem 101 that receives an axle stem 99 of the output member 96 so that the input and output members 94 and 96 are coaxially arranged and rotate relative to each other.

Figure 6:
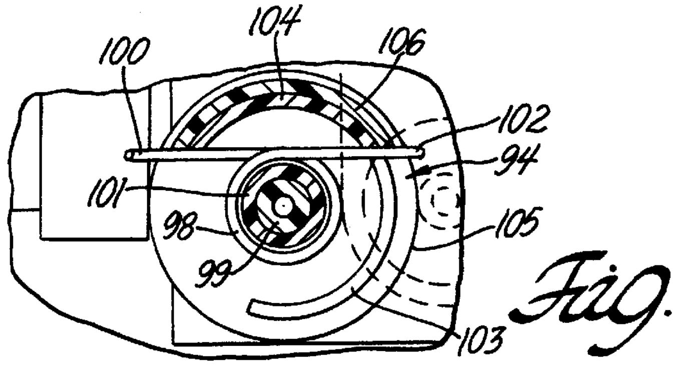
FIG. 6 is a section taken substantially along the line 6—6 of FIG. 4 looking in the direction of the arrows.

The input member 94 has a part circular wall 103 of reduced height contiguous with a part circular wall 104 of full height that nests in a depending part circular wall 106 of the output member 96 as best shown in FIG. 6. The torsion spring 98 is disposed on the hollow stem 101 and inside the part circular walls 103 and 104 of the input member 94 with the radial legs 100 and 102 engaging opposite circumferential ends of the nested walls 104 and 106. Thus the input member 94 drives the torsion spring 98 which in turn drives the output member 96. This drive mechanism normally transfers drive from the electric motor 55 to the output member 96 but allows the electric motor 55 to continue driving the input member 94 in the event that pivotal movement of the stop sign assembly 18 is halted by one reason or another during operation such as by hitting an obstruction.

Figure 4:
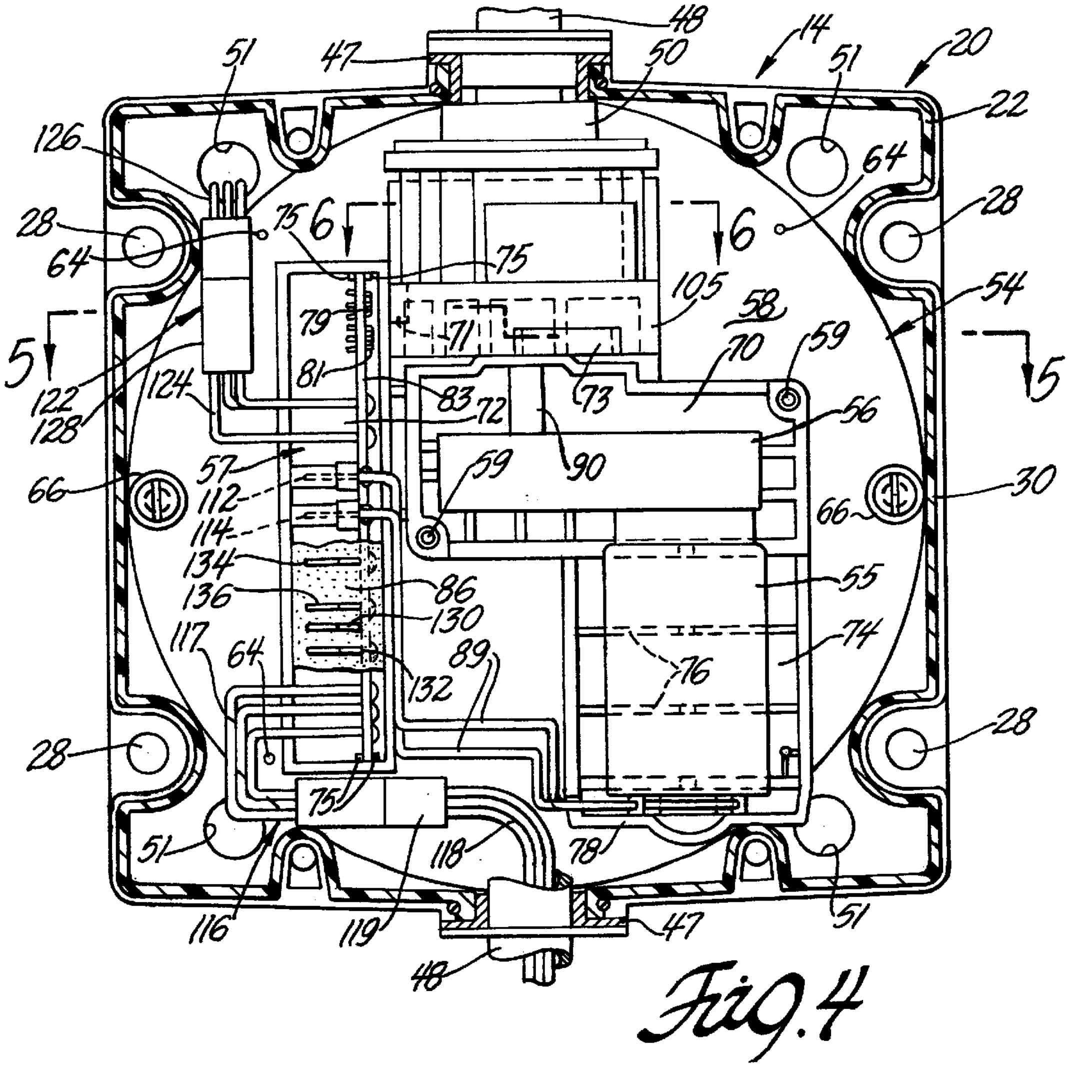
FIG. 4 is a section taken substantially along the line 4—4 of FIG. 3 looking in the direction of the arrows.
Figure 5:
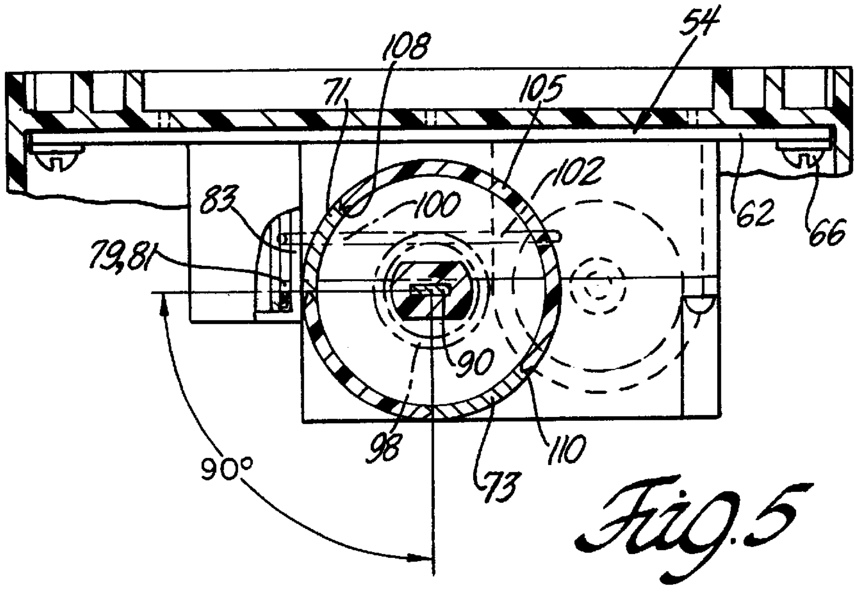
FIG. 5 is a section taken substantially along the line 5—5 of FIG. 4 looking in the direction of the arrows.

Input member 94 also includes a depending circular skirt 105 that includes two circumferentially spaced notches 108 and 110 that hold permanent magnets 71 and 73 respectively so that the trailing edge of magnet 71 is spaced 90 degrees from the leading edge of magnet 73 as best shown in FIG. 5. Notch 108 is deeper than notch 110 so that magnet 71 is also higher than magnet 73 in the vertical direction as best shown in FIG. 4.

Magnets 71 and 73 operate Hall effect sensors 79 and 81 respectively. Sensors 79 and 81 are attached to a circuit board 83 that is disposed in the rectangular cavity 72 of the sealed electronic control unit 57 and located by side rails 75. Sensors 79 and 81 are in a vertically spaced alignment with each other and in a planar alignment with magnets 71 and 73 respectively. The Hall effect sensors 79 and 81 are part of the electronic control unit 57. The electronic control unit 57 further includes a wiring harness indicated generally at 122 in FIG. 4 that is connected to the circuit board 83 which provides the electrical circuit or circuits for the electronic control unit 57.

The wiring harness 122 comprises two sub-harnesses 124 and 126 that are connected together by an unpluggable electrical connector 128. Sub-harness 124 is connected to an electrical circuit of the circuit board 83. Sub-harness 126 is a pig-tail that leads out of the outer housing 20 and into the bus to connect to an electrical power source and control switch inside the bus (shown schematically in FIG. 8). The electrical connector 128 is provided so that the subassembly 54 can be detached and removed from the outer housing 20 after the pig-tail 126 is wired into the bus.

The electronic control unit 57 includes terminals 112 and 114 that are connected to a motor control circuit portion of the electrical circuit of the circuit board 83. Terminals 112 and 114 are connected to motor 55 by the two wire leads 89 that have end terminals mating with terminals 112 and 114. Motor control circuits are well known and need not be described in detail.

Figure 8:
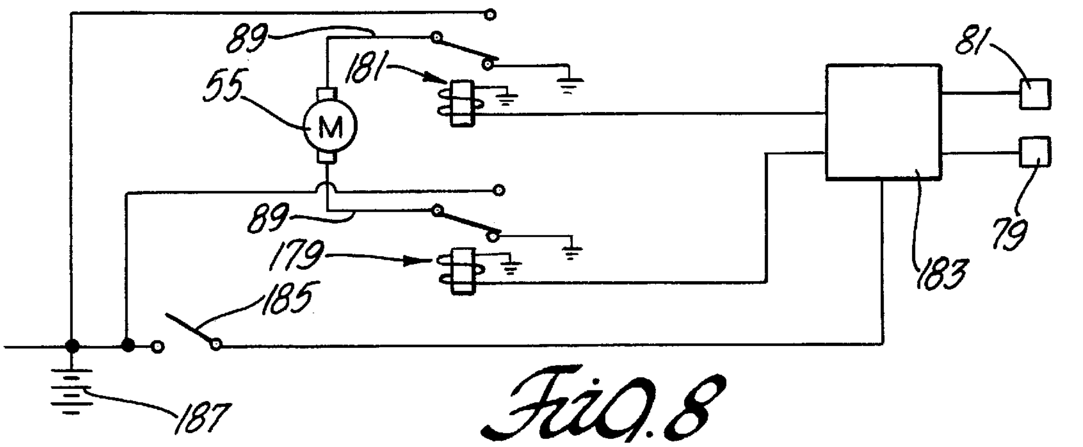
FIG. 8 is a schematic diagram of the electrical circuit controlling the electrical motor for moving the hinged stop sign assembly shown in FIGS. 1–7.

FIG. 8 is a schematic diagram of a typical electrical circuit for controlling the electric motor 55 which is preferably a bidirectional DC motor. Electric motor 55 is controlled by means of the Hall effect sensors 79 and 81 that control two single pole double throw relays 179 and 181 via an interface device 183. Interface devices are well known and thus the interface device 183 is not shown in detail. FIG. 8 shows the condition of the electrical circuit when the stop sign assembly 18 is retracted or stored against the side of the bus 10. In this condition, magnet 71 on input member 94 is aligned with Hall effect sensor 79 (FIGS. 4 and 5) and both sides of motor 55 are connected to ground via lead wires 89 and relays 179 and 181. Stop sign assembly 18 is deployed or extended to an operative position perpendicular to the side of bus 10 by closing switch 185. Switch 185 is customarily inside the bus and generally associated with operation of the bus door so that switch 185 is closed automatically when the bus door is opened. When switch 185 is closed, relay 179 is activated via the interface device 183, connecting one side of motor 55, that is, the lower side of motor 55 as viewed in FIG. 8 to an electrical power source and the other side to ground. As stated above, electric motor 55 is preferably a DC motor and the electric power source can simply be a battery 187 which may conveniently be the lead storage battery of bus 10. Motor 55 then rotates clockwise pivoting stop sign assembly 18 outward. As stop sign assembly 18 pivots outward, magnet 73 on input member 94 is moved toward Hall effect sensor 81. When stop sign assembly 18 reaches the deployed or extended position, magnet 73 aligns with Hall effect sensor 81 producing a signal in interface device 183 that indicates the deployed position of stop sign assembly 18 and that causes relay 182 to activate and connect the other side, that is, the upper side of motor 55 as viewed in FIG. 8 to battery 187. This stops DC motor 55 which then acts as a dynamic brake holding stop sign assembly 18 in the deployed position.

Stop sign assembly 18 is returned to the stored position against the side of bus 10 by opening switch 185, which as indicated above can be done automatically with the closing of the bus door. Opening switch 185 deactivates relay 179 so that the lower side of motor 55 is grounded. Motor 55 then rotates in the opposite direction, that is, counterclockwise pivoting stop sign assembly 18 inward toward the side of bus 10. As stop sign assembly 18 pivots inward, magnet 71 approaches Hall effect sensor 79. When stop sign assembly 18 reaches the stored position, magnet 71 aligns with the Hall effect sensor 79 producing a signal that indicates the stored position of stop sign assembly 18 and that causes relay 181 to deactivate and connect the upper side of motor 55 to ground. This stops motor 55 and holds stop sign assembly 18 in the stored position because DC motor 55 now acts as a dynamic brake. The circuit has now returned to the condition shown in FIG. 8 where both side of DC motor 55 are connected to ground via wire leads 89 and relays 179 and 181.

The electronic control unit 57 preferably includes an electronic timing unit or flasher on circuit board 83 (not shown) that is connected to the signal lights of the stop arm assembly 18 by a second wiring harness 116. Wiring harness 116 also preferably comprises two sub-harnesses 117 and 118 connected together by an unpluggable electrical connector 119. Sub-harness 117 is connected to the electronic flasher on circuit board 83 while sub-harness 118 is a pigtail that leads out of the actuator assembly 14 and into stop sign assembly 18 through lower hollow arm 48. The electrical connector 119 is provided so that the stop sign assembly 18 can be removed from the electrical actuator assembly 14 and replaced easily. Stop arm assembly 18 may have flashing signal lights in the form of light emitting diodes (LEDs) fluorescent lights, incandescent lights or strobe lights. The electronic control unit 57 also preferably includes a second timing unit, a strobe light control unit as part of the electrical circuit board 83 to accommodate sign arm assemblies that have strobe lights. Wiring harness 116 may be hard wired to the primary timing unit as shown in FIG. 4 or can be plugged onto special terminals 130 and 132 for the secondary timing unit. Electronic flashers and strobe light controls are well known and hence these devices are not shown and described in detail.

The electronic control unit 57 may also include other electrical control units such as sound control units for stop sign assemblies equipped with beepers, horns or other sound warning devices. Such devices can be connected by means of other special terminals such as terminals 134 and 136 on circuit board 83 for connecting the accessory control on circuit board 83 to the accessory in the stop sign assembly via a wiring harness (not shown).

During assembly, the printed circuit board 83 is slid into rectangular cavity 72 with its edges engaging in guide rails 75. Cavity 72 is then filled with a potting material 86 such as an epoxy resin that solidifies. Thus the printed circuit board 83 and the circuits or circuits and devices attached to the circuit board 83 are then completely encapsulated in a sealant with the wiring harnesses 117 and 124 and the terminals 112, 114, 130, 132, 134 and 136 protruding from the solidified potting material 86.

The power source for energizing the electric motor 55 is typically a 12 volt lead storage battery or other electrical power source on the bus. The electronic control unit 57 is interposed between the power source 187 typically inside bus 10 and the electric motor 55 for controlling the electric motor 55 to selectively move the stop sign assembly 18 between the retracted and extended positions by operation of control switch 185 that is also typically inside bus 10. Control switch 185 is moved between a first position (typically closed) in which the electric motor 55 drives the stop sign assembly 18 from the retracted to the extended position and a second position (typically open) in which the electric motor 55 drives the stop sign assembly 18 from the extended to the retracted position.

The electronic control unit 57 de-activates the electric motor 55 when the stop sign 18 has reached either the extended or the retracted position by means of the two Hall effect sensors 79, 81 which as shown in FIGS. 3, 4 and 5 are placed adjacent the rotating input member 94, which includes magnets 71, 73 spaced apart vertically on the lower circular skirt 105 for activating the vertically spaced Hall effect sensors 79, 81 respectively. Hall effect sensors 79, 81 are activated by alignment with their respective magnets 71, 73 as input member 94 rotates through a ninety degree path, which is the distance between the retracted and extended positions of stop sign assembly 18. Thus, the first sensor 79 stops the drive motor 55 when the stop sign assembly 18 is in the retracted or stored position. The second sensor 81 stops the electric motor 44 when the stop sign assembly 18 is in the extended or deployed position.

In operation, when the stop sign assembly 18 is in the retracted position, the end of first magnet 71 (the trailing end in a clockwise sense) is aligned with Hall effect sensor 79 so as to deactivate drive motor 55 as best shown in FIG. 5. The control switch 185 is moved into the first position (closed) and current flows through the electrical circuit board 83 and through the motor 55 to ground in a first direction so that input member 94 is driven clockwise. As the input member 94 moves clockwise moving stop sign assembly 18 to the extended position, the second magnet 73 is carried along by input member 94 toward Hall effect sensor 81. When the input member 94 rotates ninety degrees, thus moving the stop sign assembly 18 into the extended position, the end of magnet 73 (the leading end in the clockwise sense) reaches Hall effect sensor 79 and shuts electric motor 55 down by connecting both sides to battery 187.

If the stop sign assembly 18, now in the extended position, experiences any forces such as from another vehicle, a tree, a street sign, etc., the stop sign assembly 18, the arms 48 and the output member 96 all rotate together, and the wall 106 of output member 96 engages one leg 100 or 102 of the torsion spring 98 and winds up the torsion spring 98 while the other leg abuts wall 104 of input member 94. The input member 94, being attached to the electric motor 55 rotates only when a predetermined force is exceeded. The torsion spring 98 is designed to twist at a lower force and absorbs any force acting on the stop sign assembly 18 and prevents the input member 94 from rotating. When the force acting on the stop sign assembly 18 ceases, the torsion spring 98 forces the stop sign assembly 18 back into the extended position. The spring 98 operates in a similar manner to allow continued operation of electric motor 55 when the stop sign assembly 18 hits an obstruction during deployment.

It should be noted that if input member 94 is rotated past the extended position by an excessive force, electric motor 55 remains deactivated due to the substantial length of magnet 73 which keeps electric motor 55 deactivated so long as any part of magnet 73 is aligned with Hall effect sensor 81. It should also be noted that the electric motor 55 which is preferably a DC motor also acts as a dynamic brake that resists rotation past the extended position.

In order to return the stop sign assembly to the retracted position, the control switch 185 inside the bus is moved from the first to the second position (i.e. typically opened) so that current flows through motor 55 to ground in a opposite direction whereby electric motor 55 drives input member 94 counterclockwise back toward the position of FIG. 5. As the input member 94 rotates counterclockwise toward the retracted position, magnet 71 moves back toward Hall effect sensor 79. When the input member 94 rotates the full ninety degrees to the retracted position the leading end (in the counterclockwise sense) of magnet 71 reaches Hall effect sensor 79 which cuts off current flow through electric motor 55.

For installation, the entire stop sign mechanism 12 is attached to the side of the school bus 10 simply by fastening the actuator assembly 14 to the side of the bus with four fasteners 26. The cover 24 of the outer housing 20 is then removed and one of the knock-outs 45 is punched out as shown in the upper left hand corner of FIG. 4. Wiring harness 122 for the electronic control unit 57 is then routed from the outer housing 20 into the bus through the knock-out hole 51 and attached to the power source and control switch inside the bus. The wiring harness 116 for illuminating the stop sign assembly 18 is preferably connected directly to the electronic control unit 57 which also preferably includes a flasher. Wiring harness 116 which is initially brought into the outer housing 20 through the one of the hollow L-shaped arms 48 may also include an unpluggable electrical connector 119 to facilitate removal and/or replacement of the stop sign assembly 18. Alternatively, a suitable wiring harness would be plugged onto terminals 130, 132 if stroke lights were used in the stop arm assembly 18.

The cover 24 is then reattached after the wiring harness 122 is routed into the bus 10. All of the mechanical and electrical components for pivoting the stop sign assembly 18 including the electronic control unit 57 and the wiring for illuminating the stop sign assembly 18 are now in a sealed outer housing 20 where they are protected from the weather and from vandalism. Moreover the electronic control unit 57 inside the sealed outer housing 20 is encapsulated in a sealant of solidified potting material 86 for further protection. The electric motor 55, which is also particularly susceptible to contaminant damage is further protected by an inner sealed housing formed by base member 58 and cover member 60. Furthermore, the electronic control unit 57 and motor 55 and gear reduction unit 56 are part of a subassembly 54 that is easily removed for repair or replacement of these components.

While a hinged stop sign assembly of a particular type been described, the invention is also applicable to other hinged vehicle safety devices such as a hinged crossing arm safety gate 142 that can be attached to the front of the bus 10 by an identical sealed electrical actuator assembly 144 and which can be illuminated via a wiring harness that passes through the outer housing of the actuator assembly as described above. Crossing arms or safety gates as will known and described in earlier Lamparter patents that are discussed in the background of the invention. In other words, the invention has been described in an illustrative manner, and it is to be understood that the terminology which has been used is intended to be in the nature of the words of description rather than of limitation.

Obviously, many modifications and variations of the present invention are possible in light of the above teachings may be made. It is, therefore, to be understood that, within the scope of the appended claims, the invention may be practiced otherwise than as specifically described.

We claim:

1. An electrical actuator assembly for attaching a hinged safety device to a body panel of a vehicle and pivoting the hinged safety device between retracted and extended positions comprising:

a housing that is adapted for attachment to a vehicle and a cover, an electric motor disposed in the housing, a drive mechanism in the housing coupled to the electric motor for pivoting the safety device, first and second magnets carried by the drive mechanism, and an electronic control unit in the housing for controlling the electric motor, the electronic control unit having first and second Hall effect sensors cooperating with the first and second magnets for deactivating the electric motor at respective ends of a predetermined stroke, the drive mechanism including a rotary member driven by the electric motor, the rotary member carrying the first magnet in a first path and the second magnet in a second path, the first magnet coming into proximity with the first Hall effect sensor at a location corresponding to a stored position of the safety device, and the second magnet coming into proximity with the second Hall effect sensor at a location corresponding to an extended position of the safety device.

2. The electrical actuator assembly as defined in claim 1 wherein the first and second Hall effect sensors are mounted on a printed circuit board that is encapsulated in a sealant.

3. The electrical actuator assembly as defined in claim 2 wherein the first and second Hall effect sensors are aligned parallel to the rotational axis of the rotary member.

4. The electrical actuator assembly as defined in claim 3 wherein the first and second magnets are spaced circumferentially from each other.

5. The electrical actuator assembly as defined in claim 3 wherein the first magnet and the first Hall effect sensor are coplanar and the second magnet and the second Hall effect sensor are coplanar and spaced from the plane of the first magnet and the first Hall effect sensor.

6. The electrical actuator assembly as defined in claim 5 wherein the electric motor is a bi-directional DC motor.

7. The electric actuator assembly as defined in claim 5 wherein the drive mechanism includes a gear driven input member and the first and second magnets are carried by the gear driven input member.

8. The electrical actuator assembly as defined in claim 7 wherein the housing is sealed.

9. An electrical actuator assembly for attaching a hinged safety device to a body panel of a vehicle and pivoting the hinged safety device between retracted and extended positions comprising:

a housing that is adapted for attachment to a vehicle and a cover, an electric motor disposed in the housing, an electronic control unit in the housing for controlling the electric motor, the electronic control unit including a first Hall effect sensor and a second Hall effect sensor, a drive mechanism in the housing including a rotary member driven by the electric motor about a rotational axis for pivoting the safety device, a first magnet and a second magnet carried by the rotary member, the first magnet being carried by the rotary member in a first path and coming into proximity with the first Hall effect sensor at a location corresponding to a stored position of the safety device to stop the electric motor, the second magnet being carried by the rotary member in a second path and coming into proximity with the second Hall effect sensor at a location corresponding to an extended position of the safety device to stop the electric motor, the first Hall effect sensor and the second Hall effect sensors being aligned in a plane parallel to the rotational axis of the rotary member, and the first and second magnets being spaced circumferentially from each other.

10. The electrical actuator assembly as defined in claim 9 wherein the first magnet and the first Hall effect sensor are coplanar and the second magnet and the second Hall effect sensor are coplanar and spaced from the plane of the first magnet and the first Hall effect sensor.

11. The electrical actuator assembly as defined in claim 10 wherein the electric motor is a bi-directional DC motor.

12. The electric actuator assembly as defined in claim 10 wherein the drive mechanism includes a gear driven input member and the first magnet and the second magnet are carried by the gear driven input member.

13. The electrical actuator assembly as defined in claim 10 wherein the first Hall effect sensor and the second Hall effect sensors are mounted on a printed circuit board that is encapsulated in a sealant.

* * * * *

UNITED STATES PATENT AND TRADEMARK OFFICE

CERTIFICATE OF CORRECTION

PATENT NO. : 6,765,481 B2
DATED : July 20, 2004
INVENTOR(S) : James A. Haigh et al.

It is certified that error appears in the above-identified patent and that said Letters Patent is hereby corrected as shown below:

Drawing sheets, consisting of Fig. 5 thru Fig. 8, should be deleted and replaced with the drawing sheets, consisting of Fig. 5 thru Fig. 8, as shown on the attached pages.

Signed and Sealed this

Twenty-fifth Day of January, 2005

JON W. DUDAS

*Director of the United States Patent and Trademark Office*